United States Patent
Liu et al.

(10) Patent No.: US 12,236,633 B2
(45) Date of Patent: Feb. 25, 2025

(54) METHOD AND APPARATUS FOR RETRIEVING TARGET

(71) Applicants: Beijing Wodong Tianjun Information Technology Co., Ltd, Beijing (CN); Beijing Jingdong Century Trading Co., Ltd., Beijing (CN)

(72) Inventors: Wu Liu, Beijing (CN); Jiawei Liu, Beijing (CN); Tao Mei, Beijing (CN); Kecheng Zheng, Beijing (CN)

(73) Assignee: Beijing Jingdong Century Trading Co., Ltd., Beijing (CN)

( * ) Notice: Subject to any disclaimer, the term of this patent is extended or adjusted under 35 U.S.C. 154(b) by 234 days.

(21) Appl. No.: 17/764,741

(22) PCT Filed: Jan. 22, 2021

(86) PCT No.: PCT/CN2021/073322
§ 371 (c)(1),
(2) Date: Mar. 29, 2022

(87) PCT Pub. No.: WO2021/190115
PCT Pub. Date: Sep. 30, 2021

(65) Prior Publication Data
US 2023/0005178 A1    Jan. 5, 2023

(30) Foreign Application Priority Data
Mar. 25, 2020 (CN) .......................... 202010215923.4

(51) Int. Cl.
*G06V 10/25* (2022.01)
*G06T 7/73* (2017.01)
(Continued)

(52) U.S. Cl.
CPC ............... *G06T 7/73* (2017.01); *G06V 10/25* (2022.01); *G06V 10/426* (2022.01);
(Continued)

(58) Field of Classification Search
CPC ........ G06T 7/73; G06V 10/25; G06V 10/426; G06V 10/443; G06V 10/761;
(Continued)

(56) References Cited

U.S. PATENT DOCUMENTS

| 10,719,664 B2 | 7/2020 | Wang et al. |
| 2008/0219596 A1 | 9/2008 | Shiitani et al. |

FOREIGN PATENT DOCUMENTS

| CN | 1920818 A | 2/2007 |
| CN | 106095893 A | 11/2016 |

(Continued)

OTHER PUBLICATIONS

International Search Report and Written Opinion for International Application No. PCT/CN2021/073322, dated Apr. 27, 2021, 6 pages.
(Continued)

*Primary Examiner* — Chuong A Ngo
(74) *Attorney, Agent, or Firm* — Buchanan Ingersoll & Rooney PC (57) ABSTRACT

A method and an apparatus for retrieving a target are provided. The method may include: obtaining at least one image and a description text of a designated object; extracting image features of the image and text features of the description text by using a pre-trained cross-media feature extraction network; and matching the image features with the text features to determine an image that contains the designated object.

18 Claims, 5 Drawing Sheets

(51) Int. Cl.
  *G06V 10/426* (2022.01)
  *G06V 10/44* (2022.01)
  *G06V 10/74* (2022.01)
  *G06V 10/80* (2022.01)
  *G06V 10/82* (2022.01)
  *G06V 30/148* (2022.01)
  *G06V 30/262* (2022.01)

(52) U.S. Cl.
  CPC .......... *G06V 10/443* (2022.01); *G06V 10/761* (2022.01); *G06V 10/806* (2022.01); *G06V 10/82* (2022.01); *G06V 30/153* (2022.01); *G06V 30/274* (2022.01); *G06V 2201/07* (2022.01)

(58) Field of Classification Search
  CPC .... G06V 10/806; G06V 10/82; G06V 30/153; G06V 30/274; G06V 2201/07; G06F 16/5854; G06F 16/5866; G06F 16/7837; G06F 16/7867; G06F 16/9532; G06F 16/332; G06F 16/583; G06N 3/042; G06N 3/0442; G06N 3/045; G06N 3/0464; G06N 3/0475; G06N 3/094; G06N 5/022; G06N 3/08
  See application file for complete search history.

(56) References Cited

FOREIGN PATENT DOCUMENTS

| | | | | | |
|---|---|---|---|---|---|
| CN | 106202413 | A | * | 12/2016 | ............. G06F 16/00 |
| CN | 106547826 | A | | 3/2017 | |
| CN | 108319686 | A | | 7/2018 | |
| CN | 109213876 | A | | 1/2019 | |
| CN | 109299216 | A | | 2/2019 | |
| CN | 109783657 | A | | 5/2019 | |
| CN | 110059217 | A | | 7/2019 | |
| CN | 110147457 | A | | 8/2019 | |
| CN | 110765305 | A | | 2/2020 | |
| CN | 111782921 | A | | 10/2020 | |
| CN | 110781319 | B | * | 6/2022 | ........... G06F 16/434 |
| CN | 108694200 | B | | 7/2022 | |
| JP | 2008217428 | A | | 9/2008 | |
| WO | 2013159356 | A1 | | 10/2013 | |

OTHER PUBLICATIONS

Datta et al., "Align2Ground: Weakly Supervised Phrase Grounding Guided by Image-Caption Alignment," 2019 IEEE/CVF International Conference on Computer Vision (ICCV), 2601-2610.

Li et al., "Visual Semantic Reasoning for Image-Text Matching," 2019 IEEE/CVF International Conference on Computer Vision (ICCV), 4653-4661.

* cited by examiner

Fig. 6

METHOD AND APPARATUS FOR RETRIEVING TARGET

CROSS-REFERENCE TO RELATED APPLICATIONS

This application is a U.S. national stage application of International Application No. PCT/CN2021/073322, filed on Jan. 21, 2021, which claims the priority from Chinese Patent Application No. 202010215923.4, filed on Mar. 25, 2020 and titled "Method and Apparatus for Retrieving Target," the applicants of which are Beijing Wodong Tianjun Information Technology Co., Ltd. and Beijing Jingdong Century Trading Co., Ltd. The contents of each of the aforementioned applications are hereby incorporated by reference in their entireties.

TECHNICAL FIELD

Embodiments of the present disclosure relate to the field of computer technology, and in particular, to a method and apparatus for retrieving a target.

BACKGROUND

With the rapid development of Internet technology, the presentation approaches of media data are becoming more and more diverse, and different types of media data describe a given object from different perspectives.

It is expected that cross-media retrieval between different types of media data can be realized, that is, through a type of media data, media data of another media type having same semantics can be retrieved by querying.

SUMMARY

Embodiments of the present disclosure propose a method and apparatus for retrieving a target.

In a first aspect, an embodiment of the present disclosure provides a method for retrieving a target, the method including: obtaining at least one image and a description text of a designated object; extracting image features of the image and text features of the description text by using a pre-trained cross-media feature extraction network, where the cross-media feature extraction network projects the text features and the image features to a common feature space of images and texts; and matching the image features with the text features to determine an image containing the designated object.

In a second aspect, an apparatus for retrieving a target is provided according an embodiment of the disclosure. The apparatus includes: one or more processors; and a storage apparatus, storing one or more programs, where the one or more programs, when executed by the one or more processors, cause the one or more processors to implement the method described in any one of the embodiments of the first aspect.

In a third aspect, an embodiment of the present disclosure provides a computer readable medium, storing a computer program, where the computer program, when executed by a processor, implements the method described in any one of the embodiments of the first aspect.

BRIEF DESCRIPTION OF THE DRAWINGS

By reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below with reference to the accompanying drawings and embodiments. It may be understood that the specific embodiments described herein are only used to explain the related disclosure, but not to limit the disclosure. In addition, it should also be noted that, for ease of description, only parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
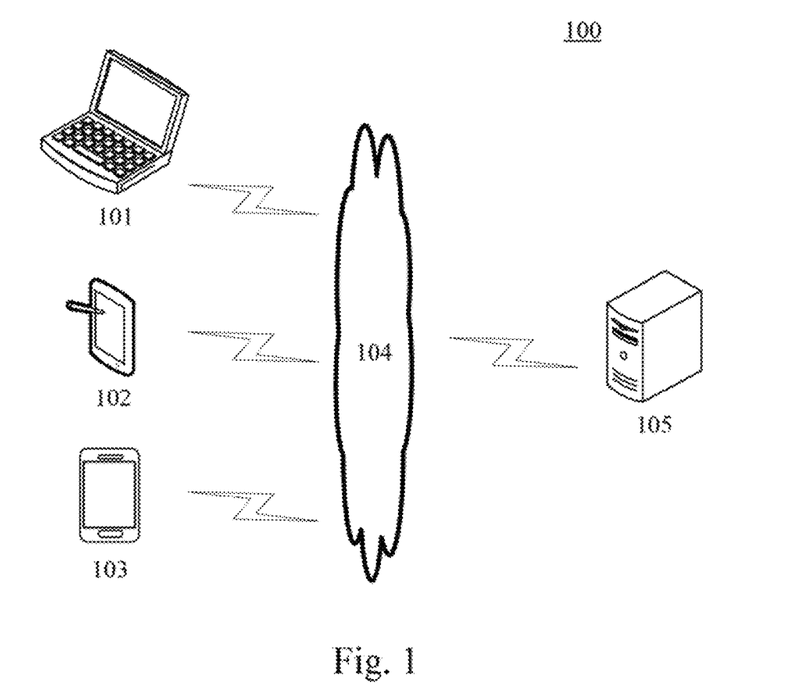
FIG. 1 is an example system architecture diagram to which an embodiment of the present disclosure may be applied.

FIG. 1 shows an example architecture 100 to which a method for retrieving a target or an apparatus for retrieving a target according to the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

The terminal devices 101, 102, 103 interact with the server 105 through the network 104 to receive or send messages and so on. Various communication client applications, such as an image editing application, a text editing application, a browser application, may be installed on the terminal devices 101, 102, 103.

The terminal devices 101, 102, and 103 may be hardware or software. When the terminal devices 101, 102, 103 are hardware, they may be various electronic devices that have a display screen and support Internet access, including but not limited to smart phones, tablet computers, laptop computers, desktop computers, and so on. When the terminal devices 101, 102, 103 are software, they may be installed in the electronic devices listed above. They may be implemented as a plurality of software pieces or software modules (for example, for providing distributed services), or as a single software piece or software module, which is not limited herein.

The server 105 may be a server that provides various services, such as a backend server that matches images and texts obtained by the terminal devices 101, 102, and 103. The backend server may recognize and match the received images and texts.

It should be noted that the method for retrieving a target provided by the embodiments of the present disclosure is generally executed by the server 105. Correspondingly, the apparatus for retrieving a target is generally provided in the server 105.

It should be appreciated that the number of terminal devices, networks and servers in FIG. 1 is merely illustrative. Any number of terminal devices, networks and servers may be provided depending on the implementation needs.

Figure 2:
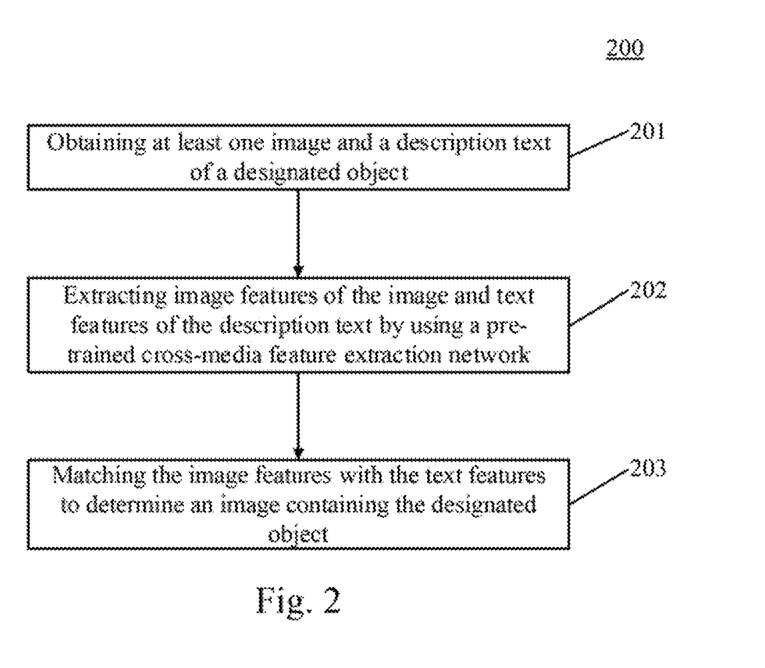
FIG. 2 is a flowchart of an embodiment of a method for retrieving a target according to the present disclosure.

With further reference to FIG. 2, a flow 200 of an embodiment of a method for retrieving a target is illustrated according to the present disclosure. The method for retrieving a target includes the following steps.

Step 201 includes obtaining at least one image and a description text of a designated object.

In the present embodiment, an executing body of the method for retrieving a target (the server as shown in FIG. 1) may obtain the at least one image and the description text of the designated object from a pre-stored image library. Here, the image may be any to-be-searched image in the pre-stored image library.

Here, the designated object refers to a to-be-retrieved entity. The designated object may be an object with a variable position, such as a pedestrian, or a vehicle. The designated object may alternatively be an object with a fixed position, such as a building, or a landscape. The number of the designated objects may be one or more. The image may contain the designated object or other objects. The text may be a sentence or a word that describes features of the designated object. For example, if the designated object is pedestrian A, then in step 201, a to-be-searched image containing a pedestrian in the image library, as well as a description text of the appearance, action and other features of the pedestrian A may be obtained. Then, in a subsequent step, the to-be-searched image is matched with the description text of the pedestrian A, and an image containing the pedestrian A that matches the description text of the pedestrian A is determined from the to-be-searched image containing the pedestrian.

Step 202 includes extracting image features of the image and text features of the description text by using a pre-trained cross-media feature extraction network.

In the present embodiment, the executing body may use the pre-trained cross-media feature extraction network to extract the image features of the at least one image and the text features of the description text of the designated object in step 201. The cross-media feature extraction network may project the text features and the image features to a common feature space of images and texts. Specifically, the cross-media feature extraction network may extract features of data of different media types, and may transform the features of data of different media types to data in a given common feature space, so that feature matching can be performed on the features of data of different media types in the given common feature space.

Here, the cross-media feature extraction network may be an artificial neural network. Based on the at least one image and the description text of the designated object obtained in step 201, the executing body may input the one or more images and the description text into the pre-trained artificial neural network, and extract the image features corresponding to the image and the text features corresponding to the text. A partial or a whole image may be selected from the one or more images to extract image features of the selected partial or whole image. A partial or a whole description text may be selected from the description text of the designated object, to extract text features of the selected partial or whole text. The features may be represented by feature vectors.

Step 203 includes matching the image features with the text features to determine an image containing the designated object.

In the present embodiment, the executing body may match the image features with the text features extracted in step 202, to determine the image containing the designated object from the at least one image as an image matching the text description.

Here, the executing body may determine whether the image features match the text features by calculating a similarity between the image features of each image and the text features of the description text. The similarity may be related to a distance between the image features and the text features, for example, Euclidean distance, Mingshi distance, Manhattan distance, Chebyshev distance, Mahalanobis distance, etc. may be used to calculate the similarity between the image features and the text features.

In practice, in order to perform more comprehensive matching to obtain image features similar to the text features, a similarity between each image feature and the text features may alternatively be calculated first, and the similarities between image features and the text features are sorted in a descending order, a pre-set number of top ranked image features are selected, and an image indicated by the pre-set number of top ranked image features is used as the image matching the text description. The pre-set number may be set according to actual needs, and may be one or more. Here, the higher the similarity between the text features and the image feature is, the greater the possibility that an object indicated by the text features and an object indicated by the image feature are a given object is.

In the method for retrieving a target provided by the above embodiment of the present disclosure, at least one image and a description text of a designated object are obtained, then image features of the image and text features of the description text are extracted by using a pre-trained cross-media feature extraction network, where the cross-media feature extraction network projects the text features and the image features to a common feature space of images and texts, and finally the image features and the text features are matched to determine an image containing the designated object, thus, features are extracted by using cross-media features, and the image features and the text features are projected to the common feature space of images and texts for feature matching, thereby achieving cross-media target search.

Figure 3:
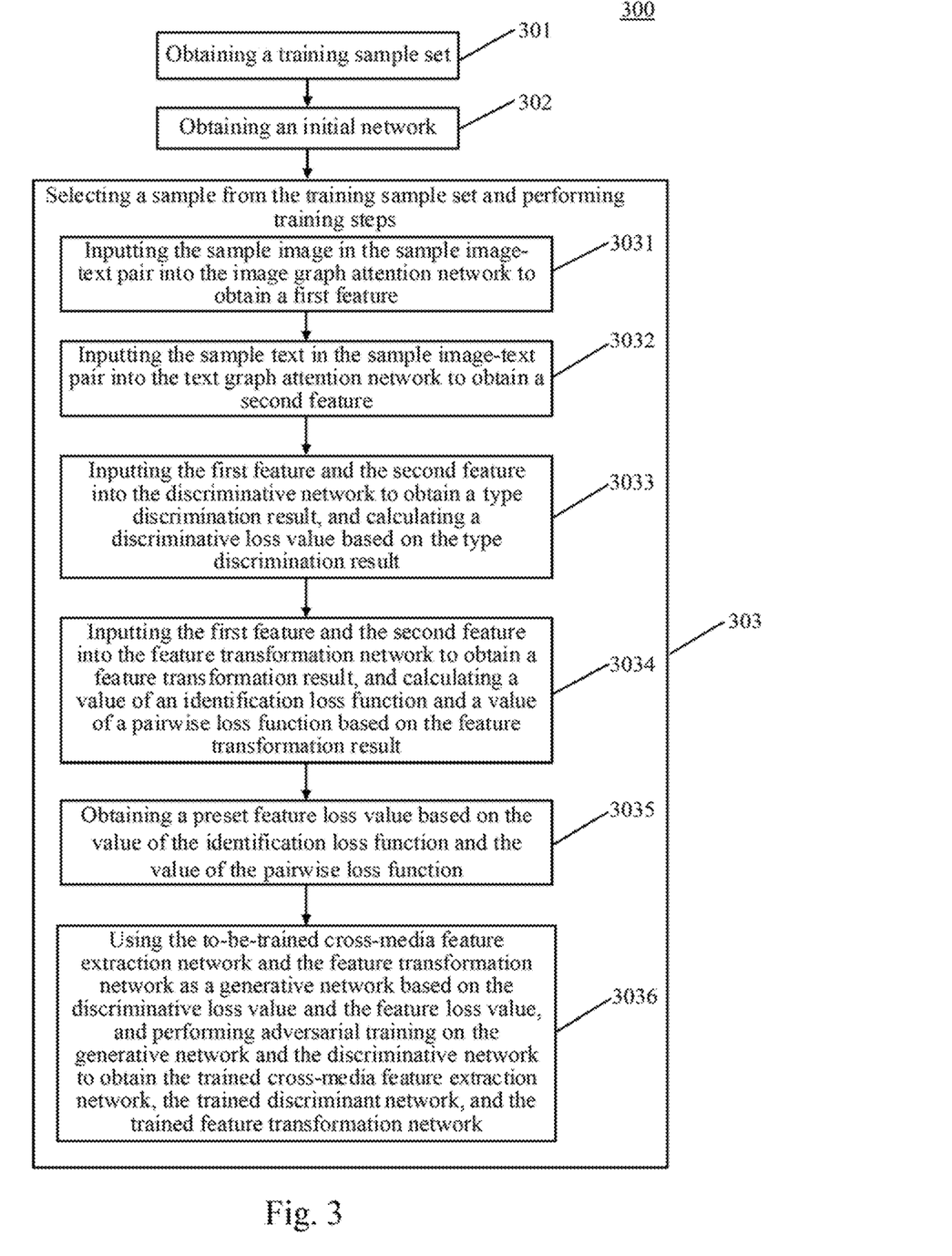
FIG. 3 is a flowchart of an implementation of a method for generating the cross-media feature extraction network.

With further reference to FIG. 3, FIG. 3 is a flowchart of an implementation of a method for generating the cross-media feature extraction network. The flow 300 of the method for generating the cross-media feature extraction network may include the following steps.

Step 301 includes obtaining a training sample set.

In the present embodiment, the executing body may obtain the training sample set from a preset database. The training sample set may include a sample image-text pair, and the sample image-text pair may include: a sample image and a sample text describing an object contained in the sample image.

Step 302 includes obtaining an initial network.

In the present embodiment, the executing body may first obtain the initial network. Specifically, the initial network may include a to-be-trained cross-media feature extraction network, a discriminative network for discriminating a data type of a feature source, and a feature transformation network, and the to-be-trained cross-media feature extraction network may include an image graph attention network, and a text graph attention network. The initial network may be an untrained neural network with initialized parameters, or a pre-trained neural network.

Step 303 includes selecting a sample from the training sample set and performing training steps.

In the present embodiment, the executing body may select the sample from the sample set obtained in step 301, and perform the training steps including step 3031 to step 3036. A selection approach and selection number of samples are not limited in the present disclosure. For example, the executing body may select at least one sample.

More specifically, the training steps include the following steps.

Step 3031 includes inputting the sample image in the sample image-text pair into the image graph attention network to obtain a first feature.

In the present embodiment, the executing body may input the sample image in the sample image-text pair into the image graph attention network of the to-be-trained cross-media feature extraction network, and output the first feature, that is, image features of the sample image.

In some alternative implementations of the present embodiment, the image graph attention network includes a residual network, an image graph attention convolutional network and a joint embedding layer. Specifically, the first feature may be obtained through the following steps.

The first step includes extracting initial image features of the sample image using the residual network.

In this alternative implementation, the executing body may extract the initial image features of the sample image using the residual network, that is, low-level visual features. Here, the initial image features may be global image features, such as color features, texture features, shape features, or structural features.

Here, after extracting the initial image features of the sample image using the residual network, the executing body may alternatively use an average pooling layer to generate a global appearance visual feature vector from the initial image features, and use the average pooling layer to reduce a dimension of the initial image features. The generated global appearance visual feature vector may preserve significant features in the initial image features.

The second step includes inputting the initial image features into the image graph attention convolutional network, to output structured image features of the sample image.

In this alternative implementation, the executing body may input the extracted low-level visual features into the pre-trained image graph attention convolutional network to obtain the structured image features of the sample image. Here, the structured image features may be used to represent structured semantic visual features of the sample image.

Alternatively, the inputting the initial image features into the image graph attention convolutional network, to output structured image features of the sample image, may also be implemented through the following steps: performing a target object detection on the sample image, determining a target object in the sample image and a position of a rectangular bounding box of the target object, and extracting a relevant feature of the target object based on the position of the rectangular bounding box of the target object; constructing an image feature directed graph, where vertices of the image feature directed graph represent target objects, and directed edges of the image feature directed graph represent an association relationship between the target objects; and generating the structured image features of the sample image based on the image feature directed graph.

In this alternative implementation, the executing body may obtain the structured image features of the sample image through the constructed image feature directed graph.

Specifically, the executing body may first recognize the target object in the sample image and the position of the rectangular bounding box of the target object by using a preset target detection algorithm, and then extract an appearance feature of the target object from the rectangular bounding box of the target object by using the target detection algorithm, and extract the relevant feature of the target object based on the position of the rectangular bounding box of the target object. For example, the relevant feature of the target object may include at least one of: the appearance feature of the target object, a position feature of the target object, and a type feature of the target object. For example, the target detection algorithm R-CNN (Region-Convolutional Neural Networks) may be used to detect the target object in the sample image. Here, the target object may be any object pre-designated according to actual application requirements, such as shoes, glasses. The position feature of the rectangular bounding box of the target object may be represented by position coordinates of the rectangular bounding box of the target object in the current sample image, for example, represented by the abscissa of a vertex of the rectangular bounding box, represented by the ordinate of a vertex of the rectangular bounding box, or represented by the position coordinates of a tuple of a relationship between a width of the rectangular bounding box and a height of the rectangular bounding box. The type of the target object may be identified, for example, according to its shape, color and other features, and the executing body may use a preset entity relationship classifier to determine the association relationship between the target objects, and use a preset attribute classifier to determine an attribute of the target object. The appearance feature of the target object may include a global appearance feature and a local appearance feature.

Then, the image feature directed graph may be constructed. The vertices of the image feature directed graph represent target objects, which may be represented by $O_i$ ($O_1$, $O_2$, $O_3$, $O_4$, $O_5$, $O_6$), and $O_i$ may represent the subject or object in the triple "subject-predicate-object", the directed edges of the image feature directed graph represent the association relationship between the target objects, which may be represented by $e_{ij}$ ($e_{15}$, $e_{16}$, $e_{21}$, $e_{31}$, $e_{41}$), for example, the directed edge $e_{ij}$ represents the relationship between the object $O_i$ and the object $O_j$, $e_{ij}$ represents the predicate in the triple "subject-predicate-object", $O_i$ may be the subject in the triple "subject-predicate-object", and $O_j$ may be the object in the triple "subject-predicate-object". The vertex features of the image feature directed graph may be represented by the obtained relevant feature representing the target object, and the relevant feature of the target object may include at least one of: the appearance feature of the target object, the position feature of the target object, and the type feature of the target object. The directed edge features of the image feature directed graph may be composed of at least one of: the appearance feature of the target object, the position feature of the target object, and the type feature of the target object.

Finally, a graph attention convolutional layer may be used to update the constructed image feature directed graph, and extract the structured image features of the sample image. Specifically, the image feature directed graph may be updated by using the graph attention convolutional layer to obtain updated vertices. The following update formula may be set to update the vertex features in the image feature directed graph:

$$v_{o_i} = \sum_{o_j \in sbj(o_i)} w_{ij} \cdot g_s(v_{o_i}, v_{e_{ij}}, v_{o_j}) + \sum_{o_k \in obj(o_i)} w_{ik} \cdot g_o(v_{o_k}, v_{e_{ki}}, v_{o_i}) \quad (1)$$

where, $g_s$, $g_o$ represent a fully connected layer, $w_{ij}$ represents a weight of the node j to the node i, $w_{ik}$ represents a weight of the node k to the node i, $o_j$ represents the node representing the subject, $o_j$ represents the node representing the predicate, $v_{o_i}$, $v_{o_k}$, $v_{o_j}$ represent node features, and $v_{e_{ij}}$, $v_{e_{ki}}$ represent directed edge features between nodes.

$w_{ij}$ may be calculated through the following formula:

$$w_{ij} = \frac{\exp(w_a \cdot v_{e_{ij}} + b_a)}{\sum_j \exp(w_a \cdot v_{e_{ij}} + b_a)} \quad (2)$$

where, $w_a$ represents a weight of the directed edge feature $v_{e_{ij}}$, and $b_a$ represents a bias term.

The updated vertex features of the image feature directed graph may be obtained through the above update formula. In order to fuse the updated vertex features, a virtual vertex is set to connect the vertices of the image feature directed graph. The virtual vertex may generate the structured image features of the sample image through the following formula:

$$v_{o_v} = \sum_{o_i \in O} w_i \cdot g_v(v_{o_i}) \quad (3)$$

where, $v_{o_v}$ represents the virtual vertex feature, $w_i$ represents a weight of the node i, and $g_v$ represents a fully connected layer.

$w_i$ may be calculated through the following formula:

$$w_i = \frac{\exp(w_c \cdot v_{o_v} + b_c)}{\sum_j \exp(w_c \cdot v_{o_v} + b_c)} \quad (4)$$

where, $w_c$ represents a weight of the virtual vertex feature $v_{o_v}$, and $b_c$ represents a bias term.

Since the virtual vertex is connected to the vertices of the image feature directed graph, the image feature directed graph contains the relevant feature of the target object and the association relationship feature between the target objects. Therefore, the virtual vertex may fuse all the features in the updated image feature directed graph to generate the structured image features representing structured semantic information of the sample image, which may contain more effective structured semantic information, more comprehensively and more accurately represent the image features and more effectively distinguish and recognize the target object contained in the image.

The third step includes fusing the initial image features with the structured image features to generate image features.

In this alternative implementation, the executing body may fuse the initial image features obtained in the first step with the structured image features obtained in the second step to obtain the image features of the sample image.

The fourth step includes inputting the image features into the joint embedding layer to obtain the first feature.

In this alternative implementation, the executing body may input the image features obtained in the third step into the joint embedding layer to obtain the first feature. The joint embedding layer may be composed of three fully connected layers.

Step 3032 includes inputting the sample text in the sample image-text pair into the text graph attention network to obtain a second feature.

In the present embodiment, the executing body may input the sample text in the sample image-text pair into the text graph attention network of the to-be-trained cross-media feature extraction network, to output the second feature, i.e., text features of the sample text.

In some alternative implementations of the present embodiment, the text graph attention network includes a bidirectional long short-term memory network, a text graph attention convolutional network and a joint embedding layer. Specifically, the second feature may be obtained through the following steps.

The first step includes performing a word segmentation on the sample text to determine a word vector of the sample text.

In this alternative implementation, the executing body may use a common word segmentation tool or manual annotation to perform the word segmentation on the sample text, and each word in the sample text is projected into a word vector.

The second step includes extracting initial text features of the word vector of the sample text using the bidirectional long short-term memory network.

In this alternative implementation, the executing body may extract the initial text features having contextual information in the sample text using the bidirectional long short-term memory network.

The third step includes inputting the initial text features into the text graph attention convolutional network, to output structured text features of the sample text.

In this alternative implementation, the executing body may input the extracted initial text features into the pre-trained text graph attention convolutional network to obtain the structured text features of the sample text. Here, the structured text features may be used to represent structured semantic text features of the sample text.

Alternatively, the inputting the initial text features into the text graph attention convolutional network, to output structured text features of the sample text, may alternatively be implemented through the following steps: constructing a text feature directed graph, where vertices of the text feature directed graph represent the target objects indicated by the word vectors, and directed edges of the text feature directed graph represent an association relationship between the target objects indicated by the word vectors; and generating the structured text features of the sample text based on the text feature directed graph.

In this alternative implementation, the executing body may obtain the structured text features of the sample text through the constructed text feature directed graph.

Specifically, the executing body may first construct the text feature directed graph. The vertices of the text feature directed graph represent target objects, which may be represented by $O_i$ ($O_1$, $O_2$, $O_3$, $O_4$, $O_5$, $O_6$), and $O_i$ may represent the subject or object in the triple "subject-predicate-object", the directed edges of the text feature directed graph represent the association relationship between the target objects, which may be represented by $e_{ij}$ ($e_{15}$, $e_{16}$, $e_{21}$, $e_{31}$, $e_{41}$), for example, the directed edge $e_{ij}$ represents the relationship between the object $O_i$ and the object $O_j$, $e_{ij}$ represents the predicate in the triple "subject-predicate-object", $O_i$ may be the subject in the triple "subject-predicate-object", and $O_j$ may be the object in the triple "subject-predicate-object". The vertex features of the text feature directed graph may be composed of the relevant feature of the target object, and the relevant feature of the target object may include at least one of: an attribute feature of the target object and the type feature of the target object. The directed edge features of the text feature directed graph may be composed of the type features of the target object.

Then, the graph attention convolutional layer may be used to update the constructed text feature directed graph, and the vertex features of the text feature directed graph may be updated using the above update formula (1). The executing body may set a virtual vertex connecting the vertices of the text feature directed graph. The virtual vertex may generate the structured text features of the sample text through the formula (3), which may contain more effective structured semantic information, more comprehensive and more accurate represent the text features and more effectively distinguish and recognize the target object contained in the text.

The fourth step includes fusing the initial text features with the structured text features to generate text features.

In this alternative implementation, the executing body may fuse the initial text features obtained in the second step with the structured text features obtained in the third step to obtain the text features of the sample text.

The fifth step includes inputting the text features into the joint embedding layer to obtain the second feature.

In this alternative implementation, the executing body may input the text features obtained in the fourth step into the joint embedding layer to obtain the second feature. The joint embedding layer may be composed of three fully connected layers.

Step 3033 includes inputting the first feature and the second feature into the discriminative network to obtain a type discrimination result, and calculating a discriminative loss value based on the type discrimination result.

In the present embodiment, the executing body may input the first feature and the second feature into the discriminative network to obtain the type discrimination result, and calculate the discriminative loss value based on the type discrimination result. The data type of the feature source includes a text type and an image type, and the discriminative loss value represents an error of determining types of the first feature and the second feature. The discriminative network may be composed of three fully connected layers, aiming to better determine and identify the data type of a source of a given feature, that is, a modal type of the feature, such as the text type, the image type, and the discriminative loss value $L_{adv}(\theta_D)$ may be calculated through the following loss function:

$$L_{adv}(\theta_D) = -\frac{1}{N}\sum_{i=1}^{N} \log D(v_i; \theta_D) + \log(1 - D(t_i; \theta_D)) \quad (5)$$

where, $v_i$ represents the first feature, $t_i$ represents the second feature, $D(v_i; \theta_D)$, $D(t_i; \theta_D)$ represent a data type probability of the feature source of the input sample i, and $\theta_D$ represents a network parameter of the discriminative network.

Step 3034 includes inputting the first feature and the second feature into the feature transformation network to obtain a feature transformation result, and calculating a value of an identification loss function and a value of a pairwise loss function based on the feature transformation result.

In the present embodiment, the executing body may input the first feature and the second feature into the feature transformation network to obtain the feature transformation result, and calculating the value of the identification loss function and the value of the pairwise loss function based on the feature transformation result. The identification loss function represents an ability of distinguishing different objects contained in the first feature and the second feature in the common feature space of images and texts, and the pairwise loss function represents a semantic difference between the first feature and the second feature of a given object. The executing body may calculate the identification loss value $L_{ide}(\theta_V, \theta_T)$ through the following loss function:

$$L_{ide}(\theta_V, \theta_T) = -\frac{1}{N}\sum_{i=1}^{N}\log \frac{e^{W_{y_i}^T x_i + b}}{\sum_{j=1}^{K} e^{W_j^T x_j + b}} \quad (6)$$

where $y_i$ represents the serial number of the target object corresponding to the $i^{th}$ sample (sample text or sample image), $x_i$ represents the first feature or the second feature, $\theta_V$ represents a network parameter of the image graph attention convolutional network, $\theta_T$ represents a network parameter of the text graph attention convolutional network, $W_j$ represents the $j^{th}$ column of the weight matrix W, b represents a bias term, and N represents the number of samples.

The executing body may calculate the pairwise loss value $L_{pair}(\theta_V, \theta_T)$ through the following loss function:

$$L_{pair}(\theta_V, \theta_T) = -\frac{1}{M}\sum_{i=1}^{M}\log \frac{e^{W_{p,y_i}^T z_i + b_p}}{\sum_{j=1}^{2} e^{W_{p,y_j}^T z_j + b_p}} \quad (7)$$

where, $y_i$ represents a two-dimensional vector indicating whether an input pair of sample image and sample text indicates the serial number of a given target object, $z_i$ represents fusion features of the text features and the image features, $W_{p,j}$ represents the $j^{th}$ column of the weight matrix $W_p$, $b_p$ represents a bias term, and M represents the number of input pairs of sample image and sample text.

Step 3035 includes obtaining a preset feature loss value based on the value of the identification loss function and the value of the pairwise loss function.

In the present embodiment, the executing body may add the identification loss value and the pairwise loss value obtained in step 3034 to obtain the feature loss value of the feature transformation network.

Step 3036 includes using the to-be-trained cross-media feature extraction network and the feature transformation network as a generative network based on the discriminative loss value and the feature loss value, and performing adversarial training on the generative network and the discriminative network to obtain the trained cross-media feature extraction network, the trained discriminative network, and the trained feature transformation network.

In the present embodiment, the executing body may use the to-be-trained cross-media feature extraction network and the feature transformation network as the generative network based on the discriminative loss value obtained in step 3033 and the feature loss value obtained in step 3035, and perform adversarial training on the generative network and the discriminative network. Specifically, the network parameter $\theta_V$ of the image graph attention convolutional network, the network parameter $\theta_T$ of the text graph attention convolutional network, and the network parameter $\theta_D$ of the discriminative network may be guided for training optimization by setting the following loss function:

$$\hat{\theta}_V, \hat{\theta}_T = \underset{\theta_V, \theta_T}{\arg\min} (L_{fea}(\theta_V, \theta_T), \theta_T) - L_{adv}(\theta_D) \quad (8)$$

$$\hat{\theta}_D = \underset{\theta_D}{\arg\max} (L_{fea}(\theta_V, \theta_T), \theta_T) - L_{adv}(\theta_D) \quad (9)$$

where $L_{fea}(\theta_V, \theta_T)$ represents the feature loss value, and $L_{adv}(\theta_D)$ represents the discriminative loss value.

When a difference between the feature loss value and the discriminative loss value reaches the maximum, the optimized network parameter $\theta_V$ of the image graph attention convolutional network and the network parameter $\theta_T$ of the text graph attention convolutional network are used as network parameters of the trained cross-media feature extraction network.

Through the above training steps, the cross-media feature extraction network can extract the text features and the image features having structured semantics, so that the cross-media feature extraction network has modality invariance, semantic discrimination, and cross-modal semantic similarity.

Figure 4:
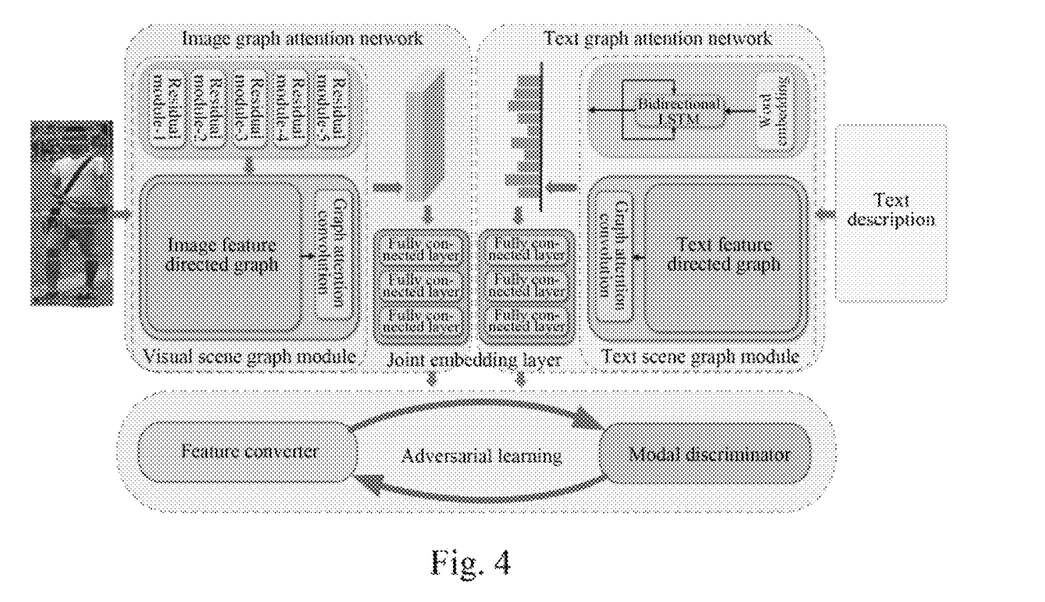
FIG. 4 is an architecture schematic diagram of an implementation process of the method for retrieving a target of the present disclosure.

With further reference to FIG. 4, FIG. 4 is an architecture schematic diagram of an implementation process of the method for retrieving a target of the present disclosure.

As shown in FIG. 4, the system architecture may include an image graph attention network, a text graph attention network, and an adversarial learning module.

The image graph attention network is used to extract image features of an image. The image graph attention network may be composed of five residual network modules, a visual scene graph module and a joint embedding layer. The visual scene graph module may be composed of an image feature directed graph and a graph attention convolutional layer. The graph attention convolutional layer is used to update the image feature directed graph, and the joint embedding layer may be composed of three fully connected layers. Specifically, the executing body may first extract initial image features of the image using the five residual network modules, then input the initial image features into the visual scene graph module, extract structured image features of the image, and finally use the joint embedding layer to project the structured image features into a common feature space of images and texts.

The text graph attention network is used to extract text features of a text. The text graph attention network may be composed of a bidirectional LSTM (Long Short-Term Memory), a text scene graph module and a joint embedding layer. The text scene graph module may be composed of a text feature directed graph and a graph attention convolutional layer. The graph attention convolutional layer is used to update the text feature directed graph, and the joint embedding layer may be composed of three fully connected layers. Specifically, the executing body may first extract initial text features of the text using the bidirectional LSTM, then input the initial text features into the text scene graph module, extract structured text features of the text, and finally use the joint embedding layer to project the structured text features into the common feature space of images and texts.

The adversarial learning module is used to determine the common feature space of images and texts for the image features and the text features, and the adversarial learning module may be composed of a feature converter and a modal discriminator. Specifically, the executing body may first input the image features extracted by the image graph attention network and the text features extracted by the text graph attention network into the adversarial learning module. The feature converter is used to project the features of different modal types (text features or image features) into the common feature space of images and texts to generate converted features. The modal discriminator is used to distinguish the modal types (text type or image type) of the converted features generated by the feature converter, then use the image graph attention network, the text graph attention network and the feature converter as a generative network, use the modal discriminator as the discriminative network, to perform joint adversarial learning, and finally use the trained image graph attention network and the trained text graph attention network as the cross-media feature extraction network.

Figure 5:
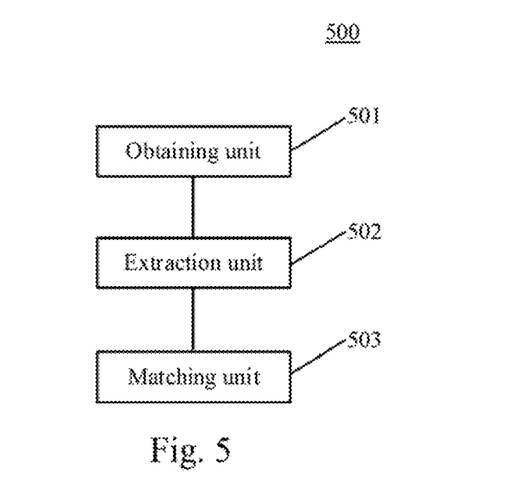
FIG. 5 is a schematic structural diagram of an embodiment of an apparatus for retrieving a target according to the present disclosure.

With further reference to FIG. 5, as an implementation of the method shown in the above figures, the present disclosure provides an embodiment of an apparatus for retrieving a target. The apparatus embodiment corresponds to the method embodiment shown in FIG. 2. The apparatus may be applied to various electronic devices.

As shown in FIG. 5, an apparatus 500 for retrieving a target of the present embodiment includes: an obtaining unit 501, an extraction unit 502 and a matching unit 503. The obtaining unit 501 is configured to obtain at least one image and a description text of a designated object. The extraction unit 502 is configured to extract image features of the image and text features of the description text by using a pre-trained cross-media feature extraction network. The matching unit 503 is configured to match the image features with the text features to determine an image containing the designated object.

In the present embodiment, for the specific processing and the technical effects of the obtaining unit 501, the extraction unit 502 and the matching unit 503 of the apparatus 500 for retrieving a target, reference may be made to the relevant description of step 201, step 202, and step 203 in the corresponding embodiment in FIG. 2 respectively, and detailed description thereof will be omitted.

In some alternative implementations of the present embodiment, the cross-media feature extraction network is generated as follows: obtaining a training sample set, where the training sample set includes a sample image-text pair, and the sample image-text pair includes: a sample image and a sample text describing an object contained in the sample image; obtaining an initial network, where the initial network includes a to-be-trained cross-media feature extraction network, a discriminative network for discriminating a data type of a feature source, and a feature transformation network, and the to-be-trained cross-media feature extraction network includes an image graph attention network, and a text graph attention network; inputting the sample image in the sample image-text pair into the image graph attention network to obtain a first feature; inputting the sample text in the sample image-text pair into the text graph attention network to obtain a second feature; inputting the first feature and the second feature into the discriminative network to obtain a type discrimination result, and calculating a discriminative loss value based on the type discrimination result, where the data type of the feature source includes a text type and an image type, and the discriminative loss value represents an error of determining types of the first feature and the second feature; inputting the first feature and the second feature into the feature transformation network to obtain a feature transformation result, and calculating a value of an identification loss function and a value of a pairwise loss function based on the feature transformation result, where the identification loss function represents an ability of distinguishing different objects contained the first feature and the second feature in the common feature space of images and texts, and the pairwise loss function represents a semantic difference between the first feature and the second feature of a given object; obtaining a preset feature loss value based on the value of the identification loss function and the value of the pairwise loss function; and using the to-be-trained cross-media feature extraction network and the feature transformation network as a generative network based on the discriminative loss value and the feature loss value, and performing adversarial training on the generative network and the discriminative network to obtain the trained cross-media feature extraction network, the trained discriminative network, and the feature transformation network.

In some alternative implementations of the present embodiment, the image graph attention network includes a residual network, an image graph attention convolutional network and a joint embedding layer; and the first feature is obtained as follows: extracting initial image features of the sample image using the residual network, inputting the initial image features into the image graph attention convolutional network, outputting structured image features of the sample image, fusing the initial image features with the structured image features to generate image features, and inputting the image features into the joint embedding layer to obtain the first feature.

In some alternative implementations of the present embodiment, the structured image features of the sample image are obtained as follows: performing a target object detection on the sample image, determining a target object in the sample image and a position of a rectangular bounding box of the target object, and extracting a relevant feature of the target object based on the position of the rectangular bounding box of the target object, where the relevant feature of the target object includes at least one of: an appearance feature of the target object, a position feature of the target object, an attribute feature of the target object and a type feature of the target object; constructing an image feature directed graph, where vertices of the image feature directed graph represent target objects, and directed edges of the image feature directed graph represent an association relationship between the target objects; and generating the structured image features of the sample image based on the image feature directed graph.

In some alternative implementations of the present embodiment, the text graph attention network includes a bidirectional long short-term memory network, a text graph attention convolutional network and a joint embedding layer; and the second feature is obtained as follows: performing a word segmentation on the sample text to determine a word vector of the sample text; and extracting initial text features of the word vector of the sample text using the bidirectional long short-term memory network, inputting the initial text features into the text graph attention convolutional network to output structured text features of the sample text, fusing the initial text features with the structured text features to generate text features, and inputting the text features into the joint embedding layer to obtain the second feature.

In some alternative implementations of the present embodiment, the structured text features of the sample text are obtained as follows: constructing a text feature directed graph, where vertices of the text feature directed graph represent target objects indicated by word vectors, and directed edges of the text feature directed graph represent an association relationship between the target objects indicated by the word vectors, where a relevant feature of the target object indicated by the word vector includes at least one of: an attribute feature of the target object and a type feature of the target object; and generating the structured text features of the sample text based on the text feature directed graph.

For the apparatus for retrieving a target provided by the above embodiment of the present disclosure, the obtaining unit 501 obtains at least one image and a description text of a designated object, the extraction unit 502 extracts image features of the image and text features of the description text by using a pre-trained cross-media feature extraction network, and the matching unit 503 matches the image features and the text features to determine an image containing the designated object. Thus, features are extracted by using cross-media features, and the image features and the text features are projected to the common feature space of images and texts for feature matching, thereby achieving cross-media target retrieval.

Figure 6:
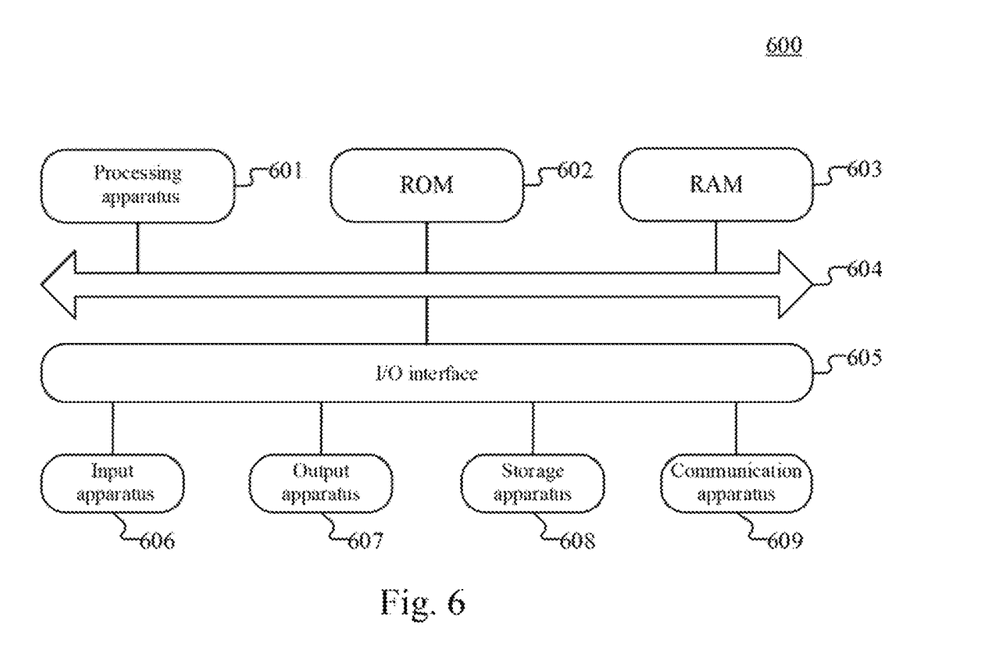
FIG. 6 is a schematic structural diagram of an electronic device adapted for implementing the embodiments of the present disclosure.

With further reference to FIG. 6, FIG. 6 shows a schematic structural diagram of an electronic device (such as the server shown in FIG. 1) 600 adapted for implementing the embodiments of the present disclosure. The server shown in FIG. 6 is only an example, and should not bring any limitation to the functions and scope of use of the embodiments of the present disclosure.

As shown in FIG. 6, the electronic device 600 may include a processing apparatus (for example, a central processing unit, a graphics processor, etc.) 601, which may execute various appropriate actions and processes in accordance with a program stored in a read-only memory (ROM) 602 or a program loaded into a random access memory (RAM) 603 from a storage apparatus 608. In the RAM 603, various programs and data required for the operation of the electronic device 600 are also stored. The processing apparatus 601, the ROM 602, and the RAM 603 are connected to each other through a bus 604. An input/output (I/O) interface 605 is also connected to the bus 604.

Typically, the following apparatuses may be connected to the I/O interface 605: an input apparatus 605 including a touch screen, a touch pad, a keyboard, a mouse, a camera, a microphone, an accelerometer, or a gyroscope; an output apparatus 607 including a liquid crystal display (LCD), a speaker, a vibrator; the storage apparatus 608 including a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the illustrated apparatuses. It may alternatively be implemented or provided with more or fewer apparatuses. Each block shown in FIG. 6 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 609, and/or may be installed from the storage apparatus 608. The computer program, when executed by the processing apparatus 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the electronic device, or a stand-alone computer readable medium not assembled into the electronic device. The computer readable medium carries one or more programs. The one or more programs, when executed by the electronic device, cause the electronic device to: obtain at least one image and a description text of a designated object; extract image features of the image and text features of the description text by using a pre-trained cross-media feature extraction network; and match the image features and the text features to determine an image that contains the designated object.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including an obtaining unit, an extraction unit and a matching unit. Here, the names of these units do not in some cases constitute limitations to such units themselves. For example, the obtaining unit may also be described as "a unit configured to obtain at least one image and a description text of a designated object".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for retrieving a target, the method comprising:
    obtaining at least one image and a description text of a designated object;
    extracting image features of the image and text features of the description text by using a pre-trained cross-media feature extraction network, wherein the cross-media feature extraction network projects the text features and the image features to a common feature space of images and texts, wherein the pre-trained cross-media feature extraction network is obtained by training an initial network comprising a to-be-trained cross-media feature extraction network, a discriminative network for discriminating a data type of a feature source, and a feature transformation network, wherein training the initial network comprises: using the to-be-trained cross-media feature extraction network and the feature transformation network as a generative network, and performing adversarial training on the generative network and the discriminative network; and matching the image features with the text features to determine an image containing the designated object.

2. The method according to claim 1, wherein the cross-media feature extraction network is generated as follows:

obtaining a training sample set, wherein the training sample set comprises a sample image-text pair, and the sample image-text pair comprises: a sample image and a sample text describing an object contained in the sample image;

obtaining the initial network, wherein the to-be-trained cross-media feature extraction network comprises an image graph attention network, and a text graph attention network;

inputting the sample image in the sample image-text pair into the image graph attention network to obtain a first feature;

inputting the sample text in the sample image-text pair into the text graph attention network to obtain a second feature;

inputting the first feature and the second feature into the discriminative network to obtain a type discrimination result, and calculating a discriminative loss value based on the type discrimination result, wherein the data type of the feature source comprises a text type and an image type, and the discriminative loss value represents an error of determining types of the first feature and the second feature;

inputting the first feature and the second feature into the feature transformation network to obtain a feature transformation result, and calculating a value of an identification loss function and a value of a pairwise loss function based on the feature transformation result, wherein the identification loss function represents an ability of distinguishing different objects contained in the first feature and the second features in a common feature space of images and texts, and the pairwise loss function represents a semantic difference between the first feature and the second feature of a given object;

obtaining a preset feature loss value based on the value of the identification loss function and the value of the pairwise loss function; and using the to-be-trained cross-media feature extraction network and the feature transformation network as the generative network based on the discriminative loss value and the feature loss value, and performing adversarial training on the generative network and the discriminative network to obtain a trained cross-media feature extraction network, a trained discriminative network, and a trained feature transformation network.

3. The method according to claim 2, wherein the image graph attention network comprises a residual network, an image graph attention convolutional network and a joint embedding layer; and the inputting the sample image into the image graph attention network to obtain the first feature comprises:

extracting initial image features of the sample image using the residual network, inputting the initial image features into the image graph attention convolutional network to output structured image features of the sample image, fusing the initial image features with the structured image features to generate image features, and inputting the image features into the joint embedding layer to obtain the first feature.

4. The method according to claim 3, wherein the inputting the initial image features into the image graph attention convolutional network to output structured image features of the sample image comprises:

performing a target object detection on the sample image, determining a target object in the sample image and a position of a rectangular bounding box of the target object, and extracting a relevant feature of the target object based on the position of the rectangular bounding box of the target object, wherein the relevant feature of the target object comprises at least one of: an appearance feature of the target object, a position feature of the target object, and a type feature of the target object;

constructing an image feature directed graph, wherein vertices of the image feature directed graph represent target objects, and directed edges of the image feature directed graph represent an association relationship between the target objects; and generating the structured image features of the sample image based on the image feature directed graph.

5. The method according to claim 2, wherein the text graph attention network comprises a bidirectional long short-term memory network, a text graph attention convolutional network and a joint embedding layer; and the inputting the sample text into the text graph attention network to obtain the second feature comprises:

performing a word segmentation on the sample text to determine a word vector of the sample text; and extracting initial text features of the word vector of the sample text using the bidirectional long short-term memory network, inputting the initial text features into the text graph attention convolutional network to output structured text features of the sample text, fusing the initial text features with the structured text features to generate text features, and inputting the text features into the joint embedding layer to obtain the second feature.

6. The method according to claim 5, wherein the inputting the initial text features into the text graph attention convolutional network to output structured text features of the sample text comprises:

constructing a text feature directed graph, wherein vertices of the text feature directed graph represent target objects indicated by word vectors, and directed edges of the text feature directed graph represent an association relationship between the target objects indicated by the word vectors, wherein a relevant feature of the target object indicated by the word vector comprises at least one of: an attribute feature of the target object and a type feature of the target object; and generating the structured text features of the sample text based on the text feature directed graph.

7. An apparatus for retrieving a target, the apparatus comprising:

at least one processor; and a memory storing instructions, wherein the instructions when executed by the at least one processor, cause the at least one processor to perform operations, the operations comprising:

obtaining at least one image and a description text of a designated object;

extracting image features of the image and text features of the description text by using a pre-trained cross-media feature extraction network, wherein the cross-media feature extraction network projects the text features and the image features to a common feature space of images and texts, wherein the pre-trained cross-media feature extraction network is obtained by training an initial network comprising a to-be-trained cross-media feature extraction network, a discriminative network for discriminating a data type of a feature source, and a feature transformation network, wherein training the initial network comprises: using the to-be-trained cross-media feature extraction network and the feature transformation network as a generative network, and performing adversarial training on the generative network and the discriminative network; and matching the image features with the text features to determine an image containing the designated object.

8. The apparatus according to claim 7, wherein the cross-media feature extraction network is generated as follows:

obtaining a training sample set, wherein the training sample set comprises a sample image-text pair, and the sample image-text pair comprises: a sample image and a sample text describing an object contained in the sample image;

obtaining the initial network, wherein the to-be-trained cross-media feature extraction network comprises an image graph attention network, and a text graph attention network;

inputting the sample image in the sample image-text pair into the image graph attention network to obtain a first feature;

inputting the sample text in the sample image-text pair into the text graph attention network to obtain a second feature;

inputting the first feature and the second feature into the discriminative network to obtain a type discrimination result, and calculating a discriminative loss value based on the type discrimination result, wherein the data type of the feature source comprises a text type and an image type, and the discriminative loss value represents an error of determining types of the first feature and the second feature;

inputting the first feature and the second feature into the feature transformation network to obtain a feature transformation result, and calculating a value of an identification loss function and a value of a pairwise loss function based on the feature transformation result, wherein the identification loss function represents an ability of distinguishing different objects contained the first feature and the second feature in the common feature space of images and texts, and the pairwise loss function represents a semantic difference between the first feature and the second feature of a given object;

obtaining a preset feature loss value based on the value of the identification loss function and the value of the pairwise loss function; and using the to-be-trained cross-media feature extraction network and the feature transformation network as the generative network based on the discriminative loss value and the feature loss value, and performing adversarial training on the generative network and the discriminative network to obtain a trained cross-media feature extraction network, a trained discriminative network, and a trained feature transformation network.

9. The apparatus according to claim 8, wherein the image graph attention network comprises a residual network, an image graph attention convolutional network and a joint embedding layer; and the first feature is obtained as follows:

extracting initial image features of the sample image using the residual network, inputting the initial image features into the image graph attention convolutional network to output structured image features of the sample image, fusing the initial image features with the structured image features to generate image features, and inputting the image features into the joint embedding layer to obtain the first feature.

10. The apparatus according to claim 9, wherein the structured image features of the sample image are obtained as follows:

performing a target object detection on the sample image, determining a target object in the sample image and a position of a rectangular bounding box of the target object, and extracting a relevant feature of the target object based on the position of the rectangular bounding box of the target object, wherein the relevant feature of the target object comprises at least one of: an appearance feature of the target object, a position feature of the target object, and a type feature of the target object;

constructing an image feature directed graph, wherein vertices of the image feature directed graph represent target objects, and directed edges of the image feature directed graph represent an association relationship between the target objects; and generating the structured image features of the sample image based on the image feature directed graph.

11. The apparatus according to claim 8, wherein the text graph attention network comprises a bidirectional long short-term memory network, a text graph attention convolutional network and a joint embedding layer; and the second feature is obtained as follows:

performing a word segmentation on the sample text to determine a word vector of the sample text; and extracting initial text features of the word vector of the sample text using the bidirectional long short-term memory network, inputting the initial text features into the text graph attention convolutional network to output structured text features of the sample text, fusing the initial text features with the structured text features to generate text features, and inputting the text features into the joint embedding layer to obtain the second feature.

12. The apparatus according to claim 11, wherein the structured text features of the sample text are obtained as follows:

constructing a text feature directed graph, wherein vertices of the text feature directed graph represent target objects indicated by word vectors, and directed edges of the text feature directed graph represent an association relationship between the target objects indicated by the word vectors, wherein a relevant feature of the target object indicated by the word vector comprises at least one of: an attribute feature of the target object and a type feature of the target object; and generating the structured text features of the sample text based on the text feature directed graph.

13. A non-transitory computer readable medium, storing a computer program, wherein the program, when executed by a processor, causes the processor to perform operations comprising:

obtaining at least one image and a description text of a designated object;

extracting image features of the image and text features of the description text by using a pre-trained cross-media feature extraction network, wherein the cross-media feature extraction network projects the text features and the image features to a common feature space of images and texts, wherein the pre-trained cross-media feature extraction network is obtained by training an initial network comprising a to-be-trained cross-media feature extraction network, a discriminative network for discriminating a data type of a feature source, and a feature transformation network, wherein training the initial network comprises: using the to-be-trained cross-media feature extraction network and the feature transformation network as a generative network, and performing adversarial training on the generative network and the discriminative network; and matching the image features with the text features to determine an image containing the designated object.

14. The non-transitory computer readable medium according to claim 13, wherein the cross-media feature extraction network is generated as follows:

obtaining a training sample set, wherein the training sample set comprises a sample image-text pair, and the sample image-text pair comprises: a sample image and a sample text describing an object contained in the sample image;

obtaining the initial network, wherein the to-be-trained cross-media feature extraction network comprises an image graph attention network, and a text graph attention network;

inputting the sample image in the sample image-text pair into the image graph attention network to obtain a first feature;

inputting the sample text in the sample image-text pair into the text graph attention network to obtain a second feature;

inputting the first feature and the second feature into the discriminative network to obtain a type discrimination result, and calculating a discriminative loss value based on the type discrimination result, wherein the data type of the feature source comprises a text type and an image type, and the discriminative loss value represents an error of determining types of the first feature and the second feature;

inputting the first feature and the second feature into the feature transformation network to obtain a feature transformation result, and calculating a value of an identification loss function and a value of a pairwise loss function based on the feature transformation result, wherein the identification loss function represents an ability of distinguishing different objects contained in the first feature and the second features in a common feature space of images and texts, and the pairwise loss function represents a semantic difference between the first feature and the second feature of a given object;

obtaining a preset feature loss value based on the value of the identification loss function and the value of the pairwise loss function; and using the to-be-trained cross-media feature extraction network and the feature transformation network as the generative network based on the discriminative loss value and the feature loss value, and performing adversarial training on the generative network and the discriminative network to obtain a trained cross-media feature extraction network, a trained discriminative network, and a trained feature transformation network.

15. The non-transitory computer readable medium according to claim 14, wherein the image graph attention network comprises a residual network, an image graph attention convolutional network and a joint embedding layer; and the inputting the sample image into the image graph attention network to obtain the first feature comprises:

extracting initial image features of the sample image using the residual network, inputting the initial image features into the image graph attention convolutional network to output structured image features of the sample image, fusing the initial image features with the structured image features to generate image features, and inputting the image features into the joint embedding layer to obtain the first feature.

16. The non-transitory computer readable medium according to claim 15, wherein the inputting the initial image features into the image graph attention convolutional network to output structured image features of the sample image comprises:

performing a target object detection on the sample image, determining a target object in the sample image and a position of a rectangular bounding box of the target object, and extracting a relevant feature of the target object based on the position of the rectangular bounding box of the target object, wherein the relevant feature of the target object comprises at least one of: an appearance feature of the target object, a position feature of the target object, and a type feature of the target object;

constructing an image feature directed graph, wherein vertices of the image feature directed graph represent target objects, and directed edges of the image feature directed graph represent an association relationship between the target objects; and generating the structured image features of the sample image based on the image feature directed graph.

17. The non-transitory computer readable medium according to claim 14, wherein the text graph attention network comprises a bidirectional long short-term memory network, a text graph attention convolutional network and a joint embedding layer; and the inputting the sample text into the text graph attention network to obtain the second feature comprises:

performing a word segmentation on the sample text to determine a word vector of the sample text; and extracting initial text features of the word vector of the sample text using the bidirectional long short-term memory network, inputting the initial text features into the text graph attention convolutional network to output structured text features of the sample text, fusing the initial text features with the structured text features to generate text features, and inputting the text features into the joint embedding layer to obtain the second feature.

18. The non-transitory computer readable medium according to claim 17, wherein the inputting the initial text features into the text graph attention convolutional network to output structured text features of the sample text comprises:

constructing a text feature directed graph, wherein vertices of the text feature directed graph represent target objects indicated by word vectors, and directed edges of the text feature directed graph represent an association relationship between the target objects indicated by the word vectors, wherein a relevant feature of the target object indicated by the word vector comprises at least one of: an attribute feature of the target object and a type feature of the target object; and generating the structured text features of the sample text based on the text feature directed graph.

* * * * *